United States Patent

Starke

[11] Patent Number: 6,053,505
[45] Date of Patent: Apr. 25, 2000

[54] SEALING DEVICE BETWEEN MOVABLE PARTS IN MUTUAL CONTACT

[75] Inventor: Wilfried Starke, Enningerloh, Germany

[73] Assignee: Mannesmann AG, Düsseldorf, Germany

[21] Appl. No.: 08/981,778

[22] PCT Filed: May 31, 1996

[86] PCT No.: PCT/DE96/01003

§ 371 Date: Dec. 8, 1997

§ 102(e) Date: Dec. 8, 1997

[87] PCT Pub. No.: WO96/41979

PCT Pub. Date: Dec. 27, 1996

[30] Foreign Application Priority Data

Jun. 9, 1995 [DE] Germany ............... 196 21 915

[51] Int. Cl.⁷ ........................................ F16J 15/08
[52] U.S. Cl. ............... 277/630; 277/577; 277/637; 277/939; 277/551
[58] Field of Search .................. 277/630, 550, 277/551, 572, 577, 637, 645, 939, 940; 403/23, 288; 49/498.1, 493.1; 248/74.1

[56] References Cited

U.S. PATENT DOCUMENTS

| | | |
|---|---|---|
| 2,790,614 | 4/1957 | Miller . |
| 2,891,289 | 6/1959 | Guilbert . |
| 3,020,185 | 2/1962 | Moffitt et al. . |
| 4,141,107 | 2/1979 | Sheiman et al. ............... 16/128 R |
| 4,223,660 | 9/1980 | Lang ............................... 126/190 |
| 4,441,726 | 4/1984 | Uhl . |
| 4,724,863 | 2/1988 | Connor .......................... 137/240 |
| 4,790,502 | 12/1988 | Saegusa ......................... 248/74.1 |
| 4,811,529 | 3/1989 | Harris et al. ..................... 52/396 |
| 5,118,916 | 6/1992 | Hucik ............................. 219/117.1 |
| 5,193,823 | 3/1993 | Janich . |

*Primary Examiner*—Anthony Knight
*Assistant Examiner*—Alison K. Pickard
*Attorney, Agent, or Firm*—Cohen, Pontani, Lieberman & Pavane

[57] ABSTRACT

A device for sealing connecting two assembly parts (1, 2) that are movable relative to one another, especially between two damper blades or one damper blade and one stop of a flue gas fitting, containing an elastic sealing element (5), which contains two clamping edges securable to an assembly part, as well as an arched sealing zone (10). The sealing element (5) is externally surrounded in overlapping fashion over a portion of its axial length by a plurality of close-fitting holding collars (3) made of spring steel, and the holding collars are secured to the supporting element (8) in the area of the edge of the supporting surface (15) directed away from the two clamping edges (6, 7) of the sealing element (5) in the vertical direction relative to the supporting surface.

14 Claims, 8 Drawing Sheets

SEALING DEVICE BETWEEN MOVABLE PARTS IN MUTUAL CONTACT

BACKGROUND OF THE INVENTION

1. Field of the Invention

The invention relates to a device for sealing between two assembly parts that are movable relative to one another and in particular, to a device for sealing on the shut-off elements of flue gas fittings.

2. Description of the Related Art

German Patent No. DE 38 15 402 A1 discloses a device for sealing the contact zone between a movable shut-off element of a pipeline and a stationary seat, which uses an elastic seal in the form of an elongated spring-steel strip as the sealing element and is positioned in the sealing area. Outside of the arched sealing zone, in the longitudinal direction of the sealing element, the spring-steel strip has two bends. The two longitudinal edge areas of the spring-steel strip point to the same side and are placed one atop the other, as clamping edges, and can be attached to the movable shut-off element or to the stationary seal seat by means of a clamping device (e.g., a screw connection). This seal has proved to be very effective, particularly when the relative movement which occurs between the spring-steel strip and the matching seal seat during the closing process is roughly vertical relative to the arched sealing zone. In cases when the relative movement during closing is more tangential relative to the arched sealing zone, situations of extreme stress for the spring-steel seal sometimes develop, which can result in the spring-steel strip being lifted up from the supporting surface and, in consequence, in breakage of the spring-steel strip.

In order to avoid negative consequences of this type, it is known from WO 95/02136 to provide a supporting profile in the interior of the sealing element. This supporting profile, which serves as a hold-down device for the spring-steel strip, rests on the supporting surface of the spring-steel strip near the bend located farthest from the clamping point and prevents the strip from lifting up when the strip experiences tangentially directed forces. The hold-down device can be designed, for example, as a generally V-shaped profile, and it is secured between the clamping edges of the spring-steel strip by means of the clamping device. Because extraordinarily corrosive conditions frequently occur in flue gas fittings, the hold-down device, like the spring-steel strip, must be made of high-alloy material, making it quite expensive. It is also disadvantageous that when a large-area flue gas damper equipped with one of the known sealing elements is opened, the break-away torque resulting from the hold-down device can be undesirably high.

SUMMARY OF THE INVENTION

The present invention provides a novel and unobvious sealing device that overcomes the shortcomings of the prior art. In accordance with the present invention, a device for sealingly connecting two assembly parts that are movable relative to each other includes a holding collar that sourroundingly overlaps a spring-steel strip over a portion of the strip's axial length. The collar thus prevents the strip from disadvantageously separating from a supporting element when the strip is exposed to forces oriented generally tangential to the strip.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 8:
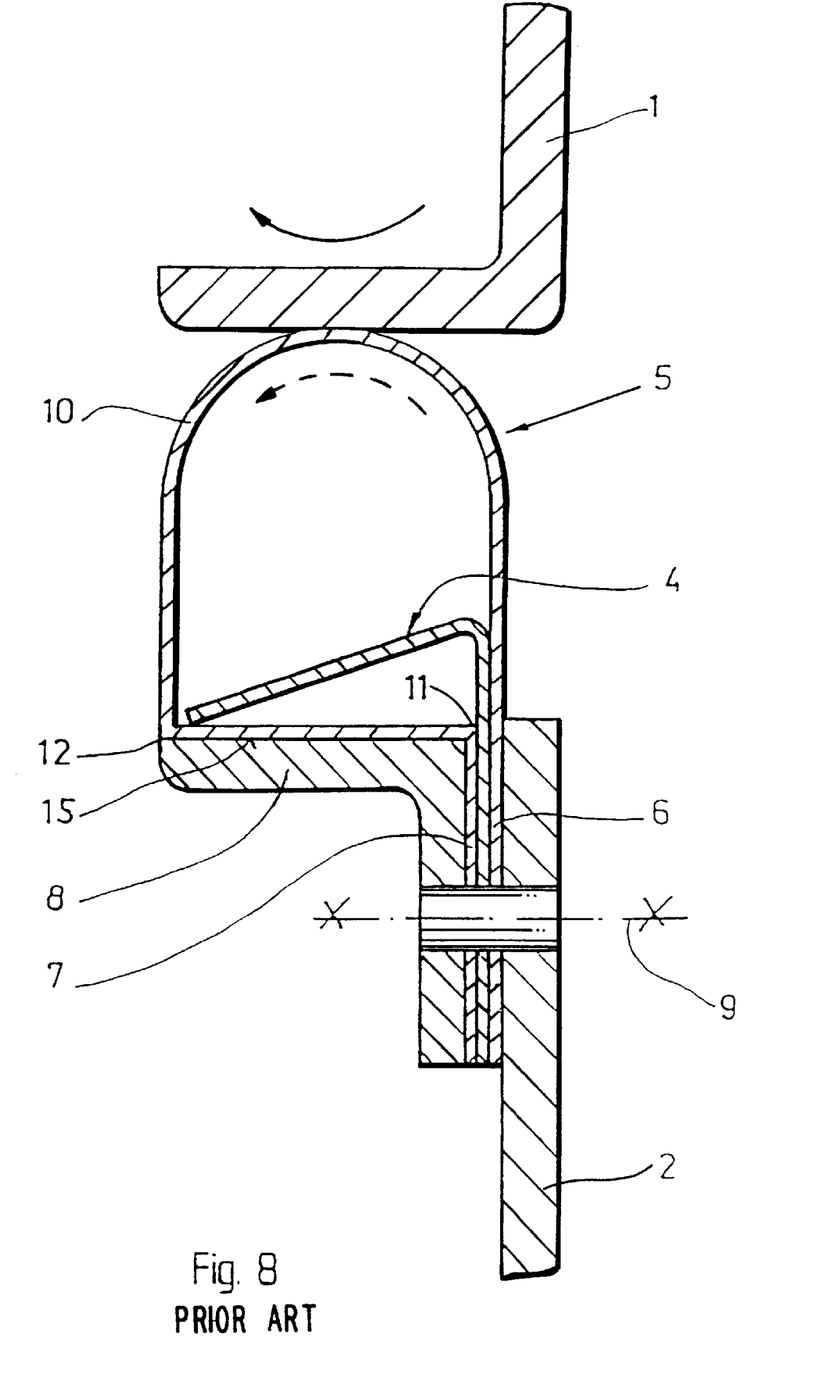
FIG. 8 is a prior art sealing arrangement.

Referring now to the drawings in detail, a prior art sealing device is shown in FIG. 8. The two assembly parts that move relative to one another and must be sealed off from one another are identified by reference numbers 1 and 2. These assembly parts may be, for example, a shut-off damper 1, which is swung into its sealing position in a direction that is generally tangential relative to the stationary assembly part 2 having spring-steel strip 5 connected thereto—with the direction of movement of the shut-off damper 1 being indicated by the solid upper curved arrow. Of course, the spring-steel strip 5 may alternatively be attached to the moved assembly part in an alternate manner with the direction of movement in this case being indicated by the lower curved arrow in dashed lines. Naturally, it is also possible to equip both of the movable assembly parts with suitable spring-steel strips 5. Furthermore, it is often the case, as with multileaf dampers, that two immediately adjacent damper blades are brought into the closed position, i.e., that both assembly parts 1, 2 are moved at the same time. In such a case, in addition to the normal forces (sealing force), significant tangential side-forces also occur.

With continued reference to FIG. 8, the spring-steel strip 5 defines a generally arc-shaped sealing zone 10. The two longitudinal edges of this spring-steel strip 5 point in the same general direction and lie atop one another in parallel fashion as the clamping edges 6, 7. Located between the clamping edge 7 and the sealing zone 10 are two bends 11, 12 of 90° that are each formed in the spring-steel strip 5, on a plane that is substantially parallel to its longitudinal edges. As a result, a supporting surface is formed on a lower side of the spring-steel strip 5 that rests flatly on a corresponding supporting surface 15 defined on a first leg of a supporting element 8, which has an L-shaped profile when viewed in cross-section, and supports the spring-steel strip 5 in the closed position against the sealing force. The vertical or second leg of the L-shaped supporting element 8 presses the two clamping edges 6, 7 against the assembly part 2 by means of a clamping device 9 (e.g., a screw connection) and thus fixes the spring-steel strip 5 in place. In order to prevent the spring-steel strip 5 from lifting up, i.e. away, from the supporting surface 15 in the area of the bend 12 when the assembly part 1 swings into the closed position, a hold-down device 4 having a generally V-shaped cross-sectional profile is provided that presses on the interior of the arched spring-steel strip 5 in the area of the bend 12 so as to hold the bend 12 in place against the support surface 15 of the supporting element 8. The hold-down device 4 is fixed in place, i.e. sandwiched, between the clamping edges 6, 7 by means of the clamping connection 9. FIG. 8 shows the spring-steel strip 5 in the non-deformed state.

Figure 1:
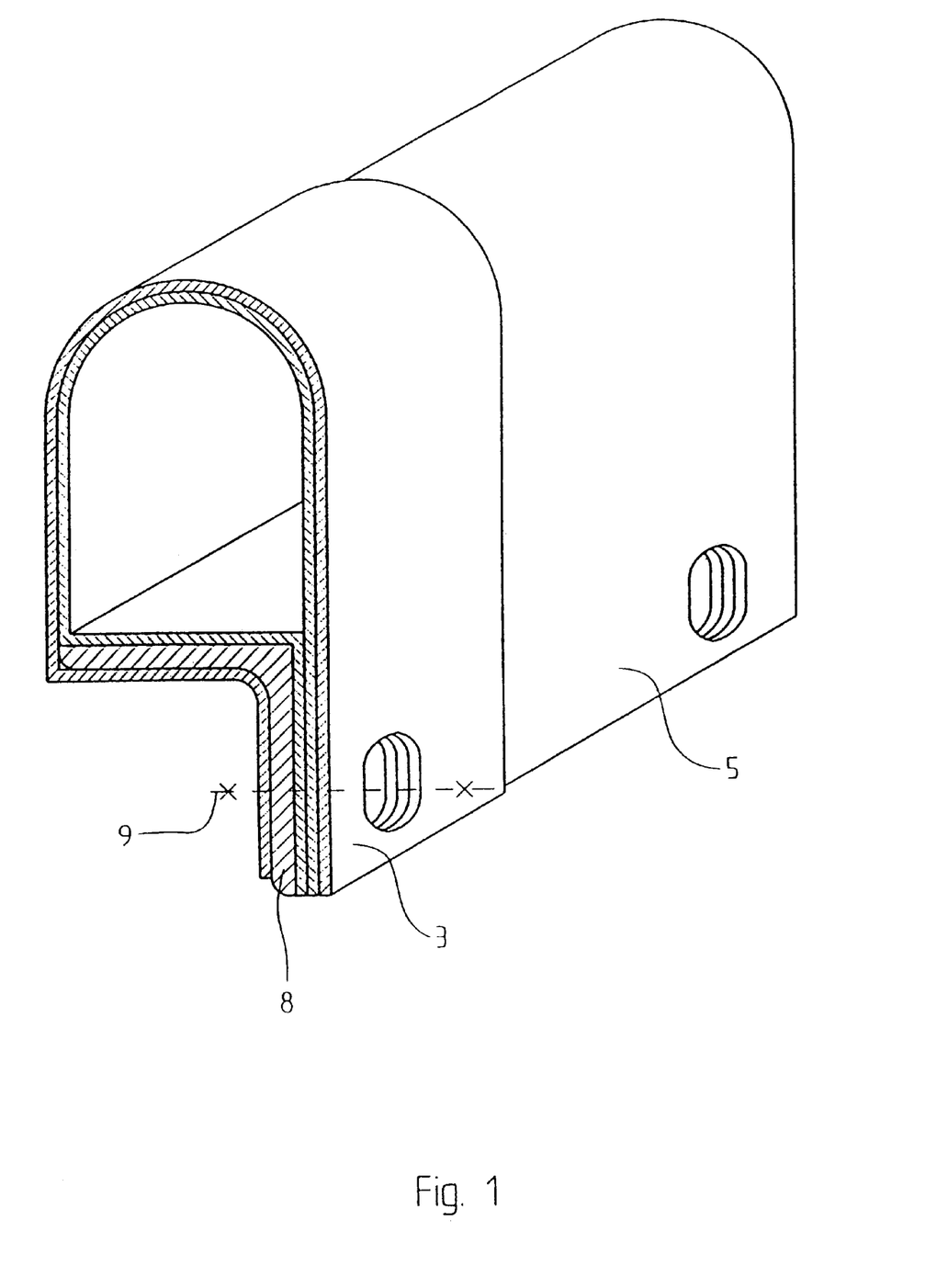
FIG. 1 is a perspective view of a sealing device having an L-shaped supporting element and configured in accordance with the present invention.
Figure 2:
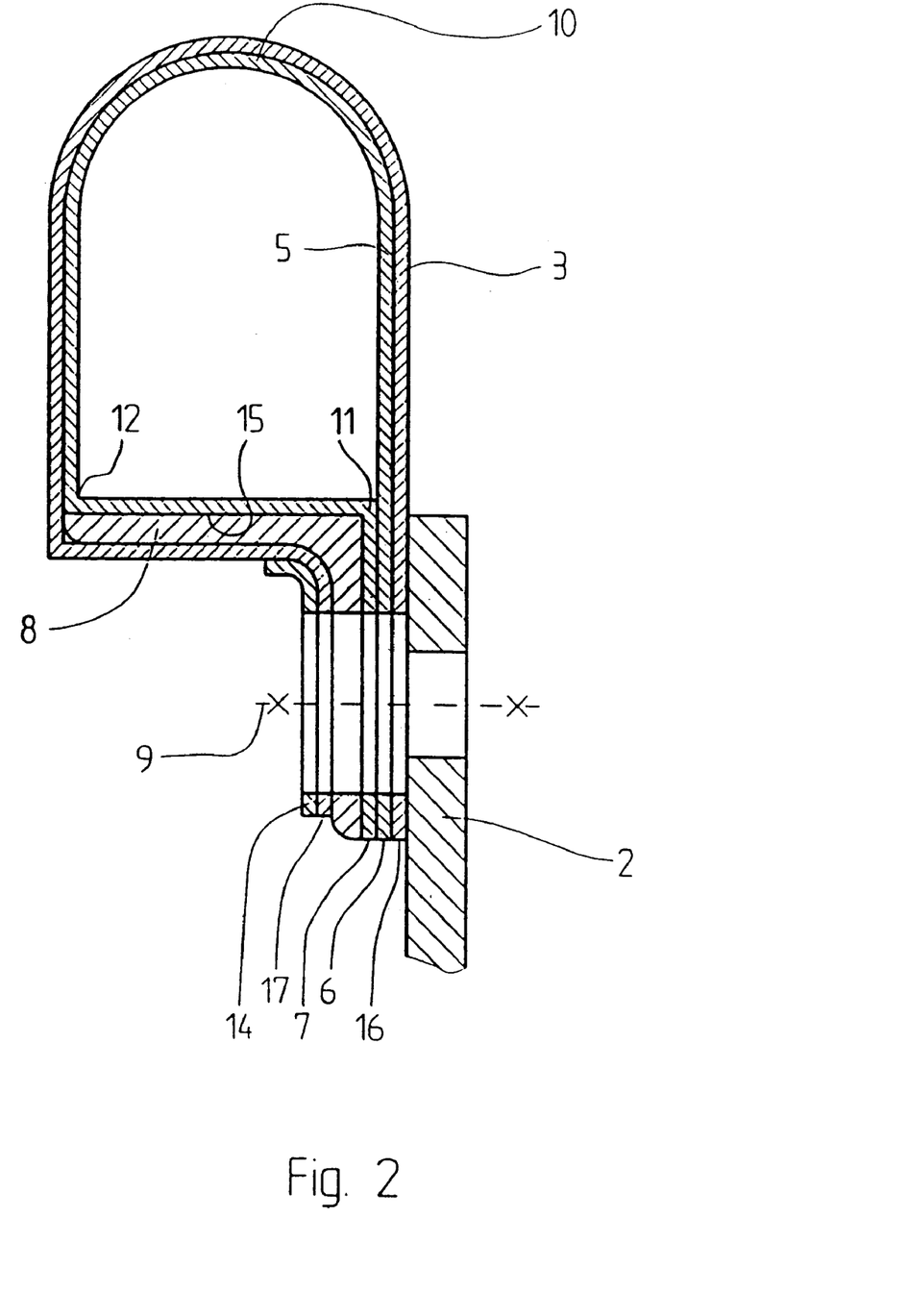
FIG. 2 is a cross-section view taken at a right angle to the longitudinal axis of the device of FIG. 1.

Starting from this prior art, the present invention proposes that the critical lifting of the spring-steel strip off of the supporting surface of the supporting element be prevented by a plurality of holding collars that are arranged axially separated from one another in such a way that each collar surrounds the spring-steel strip externally. A first embodiment is shown in perspective in FIG. 1. In FIGS. 1 to 7, the same reference numbers used in FIG. 8 are used for similar parts. In the same manner as in FIG. 8, an arched spring-steel strip 5 rests on an L-shaped of the supporting element 8. Over a section of its axial length, the spring-steel strip 5 is externally surrounded by a closely-fitting holding collar 3, which is preferably made of the same material as the spring-steel strip 5. In contrast to the spring-steel strip 5, the holding collar 3 is run in the area of the supporting element 8 so as to rest closely against the lower side of the supporting element 8 and fix or sandwich the supporting element 8 between the collar 3 and spring-steel strip 5. The spring-steel strip 5, the holding collar 3 and the supporting element 8 are held together and secured to an assembly part, i.e. such as a stationary assembly part 2, by means of the clamping connection 9, which is preferably designed as a screw connection. This is shown in greater detail in cross-section in FIG. 2. The assembly part to which the inventive sealing device is to be secured in this illustrative embodiment is indicated by reference number 2. The holding collar 3 has two bends of approximately 90° each, which correspond in location generally to the two bends 11, 12 of the spring-steel strip 5 and thus also to the angle of the supporting element 8. While the distance between the two bends 11, 12 corresponds to the width of the supporting surface 15 of the supporting element 8, the distance between the two bends of the holding collar 3 has been selected in such a way that, when mounted, the holding collar 3 rests tightly against the lower side of the L-shaped supporting element 8, i.e., the back side of the supporting surface 15. In this way, the holding collar 3 is fixed on an supporting element 8 in the area of the supporting surface 15 located remote from the clamping edges 6, 7 of the spring-steel strip 5 in the direction generally vertical with respect to the supporting surface 15, and thus cannot be lifted up in the direction of the curved sealing zone 10 of the spring-steel strip 5 i.e. away from the supporting surface 15. As a result, the spring-steel strip 5 itself is also prevented from lifting up from the support surface 15 in the area of the bend 12. In special cases, it may be advisable to provide a washer element 14 in the area of the clamping connection 9, which bears against the holding collar 3 in the area below the supporting surface 15. In FIG. 2, the washer element 14 has an is L-shaped in cross-section.

Figure 3:
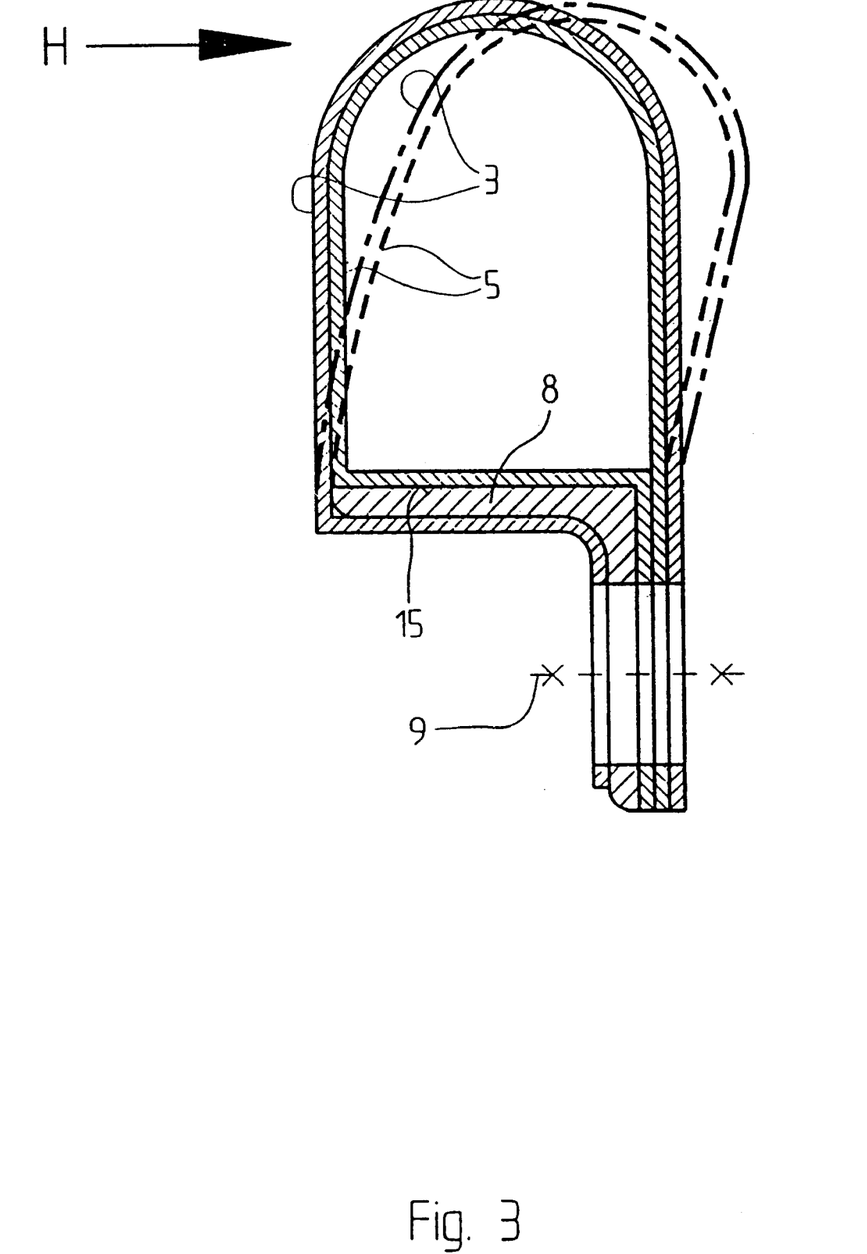
FIG. 3 is a schematic cross-section view of the device of FIG. 2 depicting deformation by a generally horizontally directed tangential force H shown in dashed lines.
Figure 4:
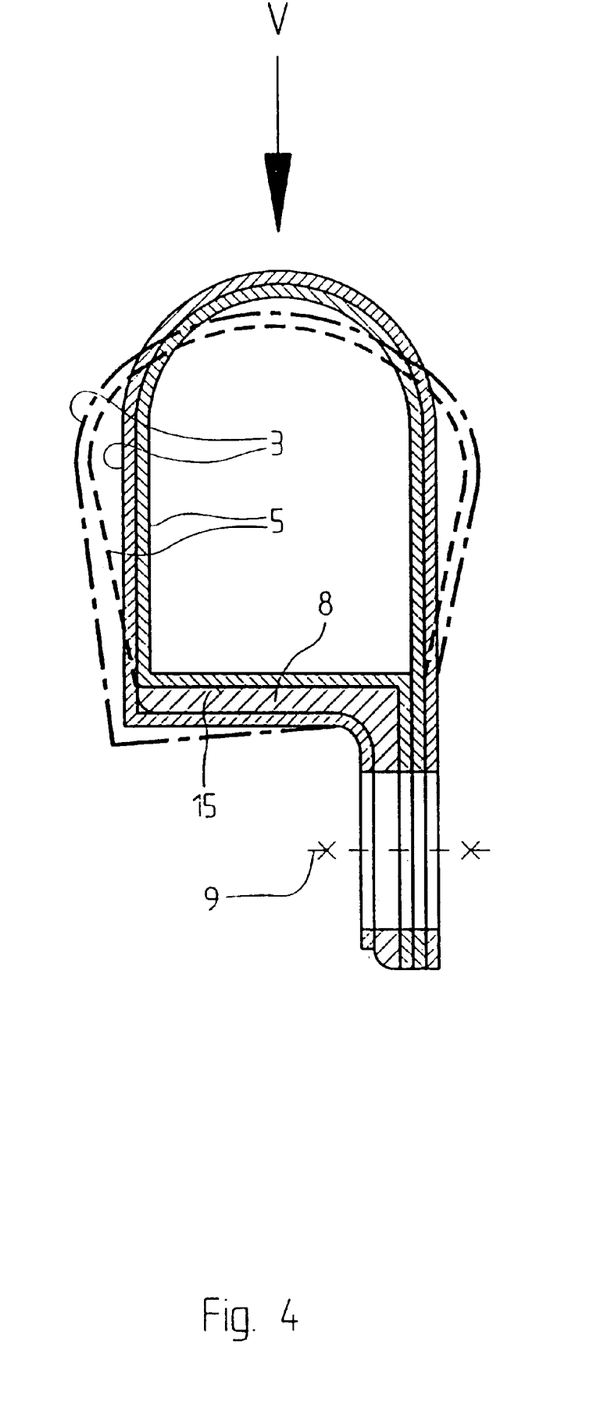
FIG. 4 is a schematic cross-sectional view of the device of FIG. 2 depicting deformation by a generally vertically directed force V shown in dashed lines.

FIGS. 3 and 4, in schematic fashion, show how the inventive sealing arrangement, as depicted in FIG. 2 may be deformed by a force H (FIG. 3) that acts in a direction that is generally tangential to the sealing area 10 and/or a force V (FIG. 4) that acts in a direction that is generally vertical with respect to the sealing area 10. The deformation of the holding collar 3 shown schematically as a dot-dashed line, while the deformation of the spring-steel strip is shown schematically as a simple dashed line. It will be apparent form FIG. 3 when subject to that even tangential deformation forces H, which run in a direction that is critical to the clamping point, the spring-steel strip 5 remaining flatly and seated on the supporting surface 15. No lifting of the spring-steel strip 5 takes place as a result of deformation forces H. On the other hand, however, the holding collar 3 definitely allows the curved spring-steel strip 5 to bend in the direction of the tangential force H, i.e. to absorb the force. The effect of generally vertically directed forces on the inventive sealing arrangement is shown in FIG. 4. It can be seen that the holding collar 3 can be lifted slightly from the back side of the supporting element 8, in a generally downward direction, in the area of the left edge (in the drawings) of the supporting surface 15. Such a tendency to lift can be counteracted by means of the washer element 14 shown in FIG. 2. In other respects, this type of force V leads to a certain inward bulging in the top area and a certain outward bulging in the side areas of the spring-steel strip 5 as well as the holding collar 3, as depicted in FIG. 4.

Figure 5:
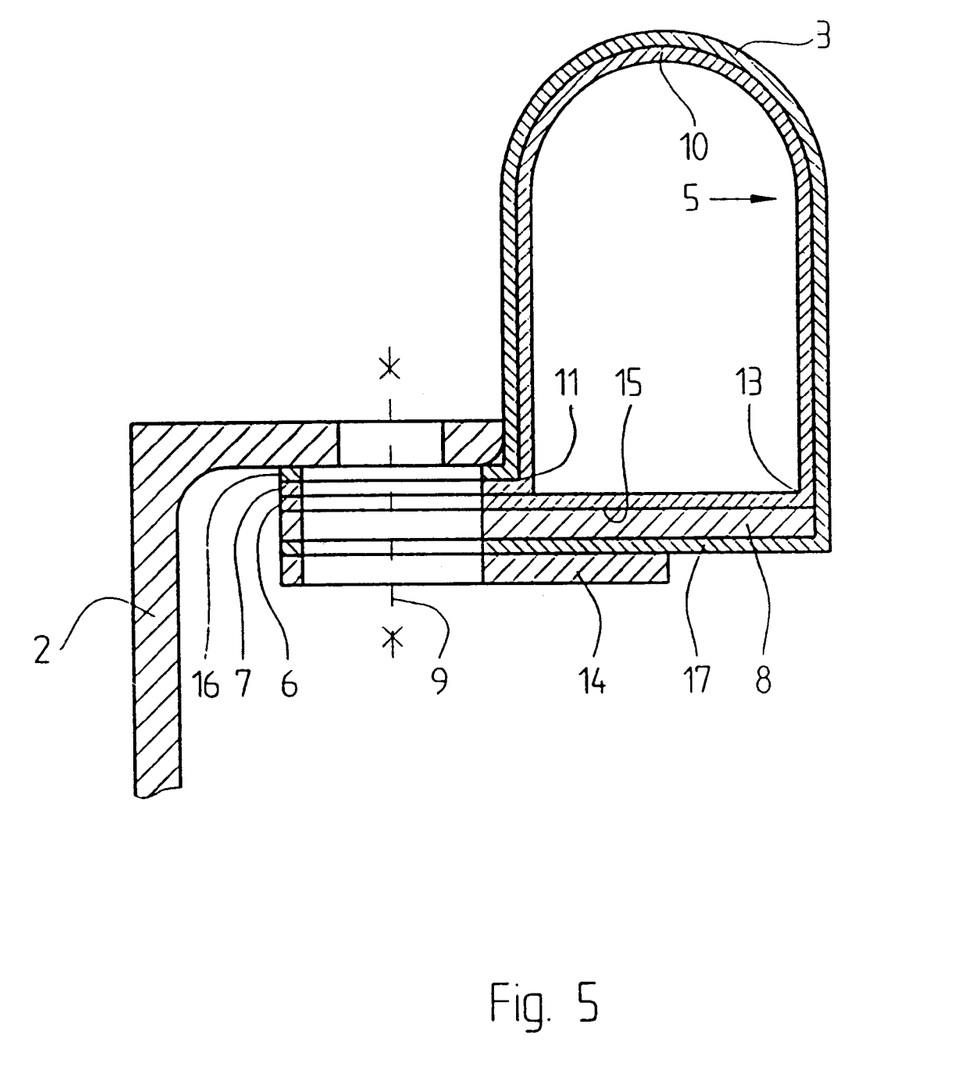
FIG. 5 is a cross-section view taken at a right angle to the longitudinal axis of a sealing device having a strip-type supporting element and configured in accordance with the present invention.

FIG. 5 depicts an alternative embodiment of the device according to the present invention. In contrast to the embodiment in FIG. 2, the spring-steel strip 5 is provided with bends 11, 13 on both sides of the sealing zone 10, ensuring its flat seating on the supporting surface 15 of the supporting element 8.

In this embodiment, the supporting element 8 is designed as a substantially planar holding strip having substantially parallel first and second sides. The holding collar 3 is provided with bends similar to those of the spring-steel strip 5, so that the clamping edges 16, 17 of the holding collar 3 can be oriented parallel to the clamping edges 6, 7 of the spring-steel strip 5. Once again, the attachment of the collar 3 and strip 5 to the assembly part 2 is preferably carried out by means of a screw connection 9. In order to increase rigidity against any lifting of the holding collar 3 in a downward direction, i.e. away from the back side of the support element 8, an additional washer element 14 can be used, as needed, in a manner similar to that shown in FIG. 2. The farther this additional washer 14 extends to the right (in the drawings) over the back side of the supporting element 8, the more rigid the holding collar 3 will be. The basic function of this embodiment of the invention corresponds to that of FIG. 2.

Figure 6:
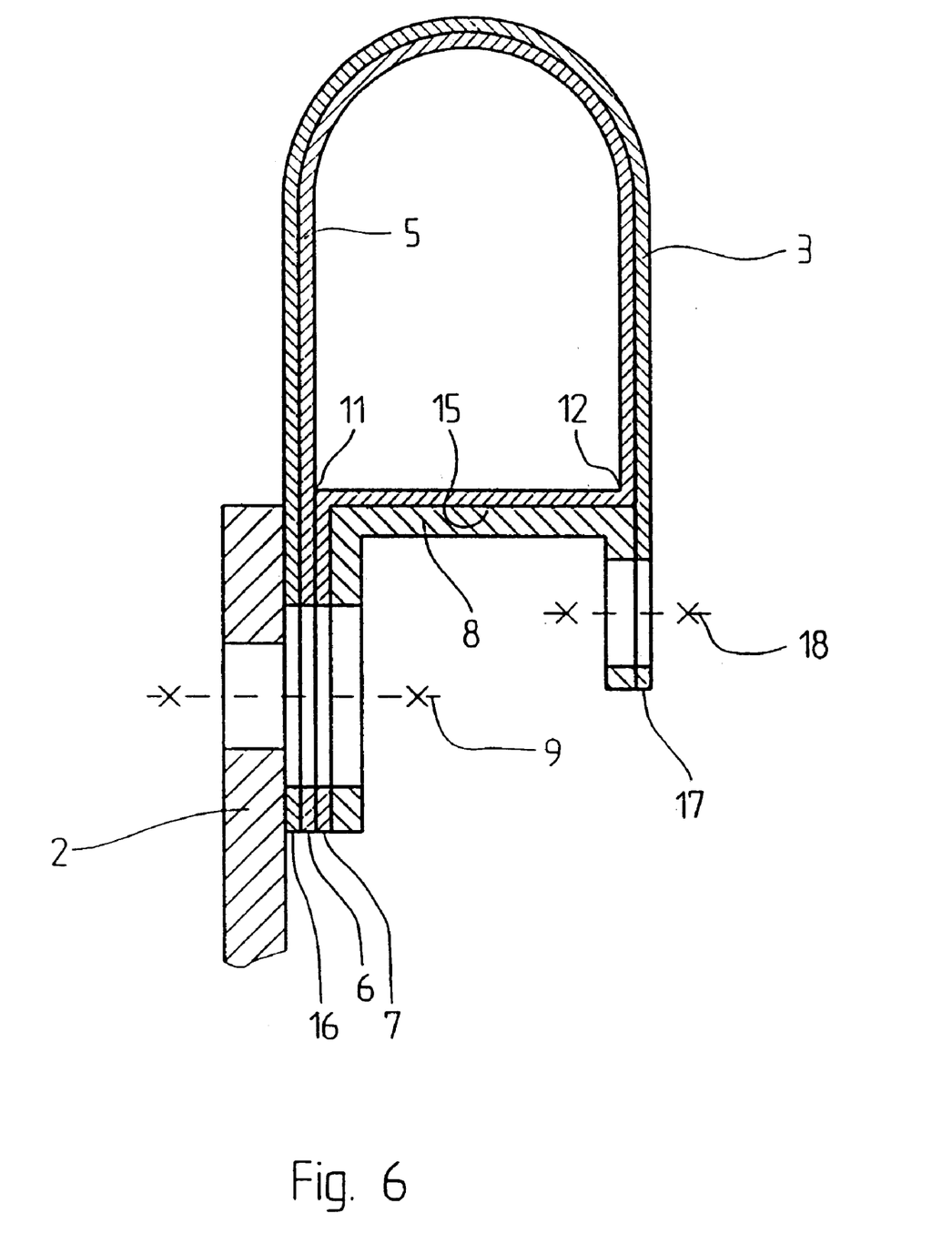
FIG. 6 is a cross-section view taken at a right angle to the longitudinal axis of a sealing device with a supporting element having a U-shaped cross-sectional profile and configured in accordance with the present invention.

A further alternative embodiment of the invention is shown in FIG. 6. In this embodiment, the supporting element 8 is generally U-shaped in cross-section profile. The outer side of the base of this supporting element 8 forms the supporting surface 15, while a first, left leg (in the drawings) of the U-shaped supporting element 8 braces the two clamping edges 6, 7 of the spring-steel strip 5 and the clamping edge 16 of the holding collar 3 on the assembly part 2 by means of the screw connection 9. The other clamping edge 17 of the holding collar 3 rests in a close-fitting manner against a second, right leg of the U-shaped supporting element 8 and is securely connected to the right, second leg by means of a screw connection 18. This embodiment offers the advantage that the holding collar 3 need not be provided with bends, but rather can be designed as a simple flat spring-steel strip 5. Once again, this solution ensures that the spring-steel strip 5 cannot lift away from the supporting surface 15 of the supporting element in the area of the bend 12. In contrast to FIGS. 2 and 5, the holding collar 3 does not rest on the back side of the supporting element 8, but rather on an angled-off extension of the supporting surface 15 (e.g. the right leg. of the U-shaped supporting element 8).

Figure 7:
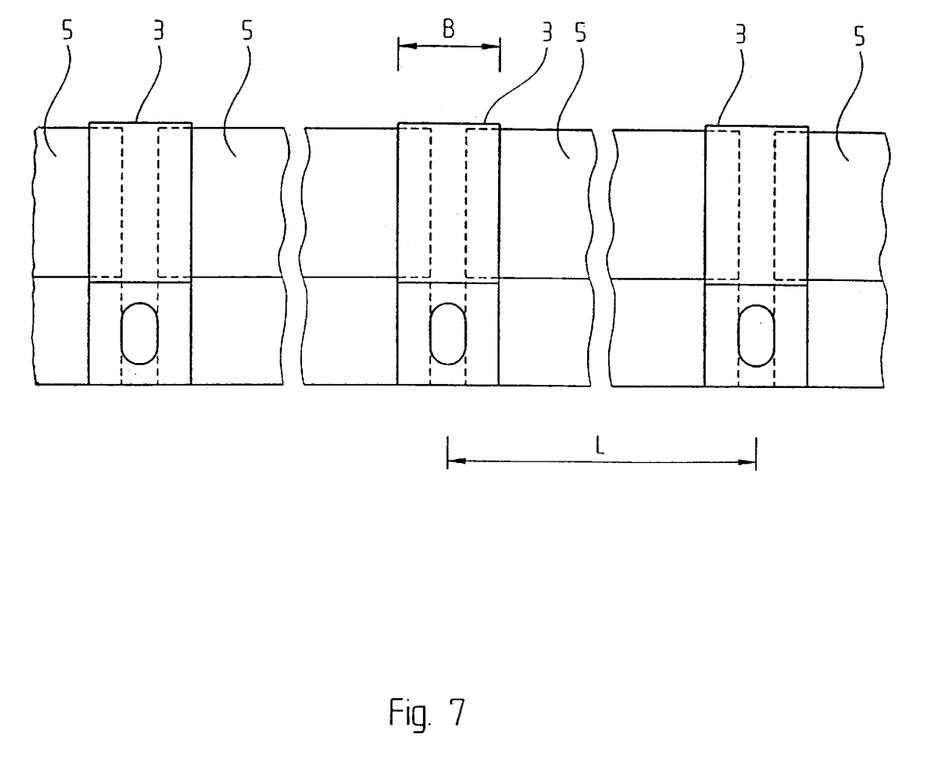
FIG. 7 is a side view of a plurality of sealing elements in accordance with the present invention.

FIG. 7 shows a preferred embodiment of the invention having a plurality of spring-steel strips 5 disposed in abutting relation to each. The sealing element 5 does not consist of a single spring-steel strip 5 that extends over the entire length of the sealing zone, but rather is composed of multiple spring-steel strips 5 having partial lengths L, with the individual spring-steel strips 5 abutting one another bluntly. It is preferable to arrange a plurality of holding collars 3 in areas in which the respective spring-steel strips 5 abut one another in such a way that the holding collars 3 overlap the abutment areas of the plural spring-steel strips 5. When these partial lengths of the spring-steel strip 5 are long, it may be advantageous to not only provide holding collars 3 in the abutment areas, but also to provide additional holding collars 3 separated from one another and located between the abutment areas. The axial length B of a holding collar 3 is preferably less than 10%, most preferably less than 5%, of the axial length L of each partial piece of the spring-steel strip 5 in question.

To make assembly easier, it is advisable to fasten the holding collars 3 to the spring-steel strip 5 by means of spot welding. It can also be advantageous to fasten the respective holding collars 3 to the supporting element 8 by means of spot welding, so that fewer loose individual parts need to be connected to one another during assembly. In general, it is advisable to secure the holding collars 3 (as shown in FIGS. 2 to 7) via the clamping connection 9, which is also used to secure the spring-steel strip 5. In principle, however, it is possible to provide separate securing devices to secure the holding collars 3.

Because only comparatively narrow holding collars are needed to prevent the sealing element from lifting off its supporting surface, and because these holding collars are needed only at a certain distance from one another and thus in relatively small numbers, and because comparatively thin spring-steel strips are adequate for this purpose, the material expense to embody a device according to the present invention is small. Furthermore, since the holding collars can be placed around the spring-steel strips from the outside, assembly is simple. Even in the case of very great tangential deformation forces, the present invention reliably prevents the sealing element from lifting off its supporting surface.

I claim:

1. A device for sealingly connecting two assembly parts that are movable with respect to each other, said device comprising:

an elastically deformable sealing element having a first axial length and being configured as a spring-steel strip having two adjacent and generally parallel longitudinally extending clamping edges that are fastenable to one of the assembly parts, said spring-steel strip defining a generally arc-shaped sealing zone having a top area, said spring-steel strip having two longitudinally extending bends located external of said sealing zone, one of said bends being disposed in generally spaced apart relation with one of said clamping edges defining therebetween a lower side of said sealing element, the movement of the two assembly parts with respect to each other being substantially tangential to said top area of said sealing zone;

a clamping device configured for fastening said sealing element to said one of the assembly parts;

a supporting element having a supporting surface defining a width and upon which said lower side of said sealing element rests in a close confronting relation; and a collar externally surrounding said sealing element over a portion of said first axial length, said collar being secured on said supporting element so as to prevent said sealing element from being movable in a direction that is substantially perpendicular with respect to said supporting surface, while maintaining the elasticity of the sealing element.

2. The sealing device of claim 1, wherein said bends of said sealing element are located between said sealing zone and one of said clamping edges, said bends being separated from each other by a distance that corresponds approximately to said width of said supporting surface.

3. The sealing device of claim 2, wherein said supporting element is substantially in longitudinal cross-section and defines a first leg, a second leg, and a base located therebetween, said first and said second legs being substantially parallel to each other and said base being substantially perpendicular to said first and said second legs, said base of said supporting element forming said support surface of said supporting element, said clamping device clamping said first leg of said supporting element and said clamping edges of said sealing element to said one of said assembly parts, said collar being secured to said second leg of said supporting element.

4. The sealing device of claim 2, wherein said supporting element is substantially L-shaped in longitudinal cross-section and defines a first leg and a second leg disposed substantially perpendicular to said first leg, said first leg having a first surface that defines said supporting surface of said supporting element, said first leg having a second surface located opposite said first surface, said clamping device clamping said second leg of said supporting element and said clamping edges of said sealing element to said one of the assembly parts, a portion of said collar being disposed adjacent said second surface of said first leg of said supporting element.

5. The sealing device of claim 4, further comprising a washer configured for securing said collar to said second surface of said supporting element.

6. The sealing device of claim 1, wherein said supporting element is a substantially planar holding strip having a first side that defines said supporting surface of said supporting element and a second side located opposite said first side, said clamping device clamping said supporting element and said clamping edges of said sealing element to said one of said assembly parts, a portion of said collar being disposed adjacent said second side of said supporting element.

7. The sealing device of claim 6, further comprising a washer configured for securing said collar to said second side of said supporting element.

8. The sealing device of claim 1, wherein said sealing device further comprises:

a plurality of sealing elements disposed in abutting relation to each other and defining a plurality of abutments therebetween; and a plurality of collars externally surrounding each of said plural abutments defined between said plural sealing elements.

9. The sealing device of claim 8, wherein one of said collars is located between each of said defined plural abutments.

10. The sealing device of claim 8, wherein said plural sealing elements each define a portion of said first axial length, wherein each of said plural collars defines a second axial length, each said second axial length being less than approximately 10% of each of said portions of said first axial length.

11. The sealing device of claim 8, wherein said plural sealing elements each define a portion of said first axial length, wherein each of said plural collars defines a second axial length, each said second axial length being less than approximately 5% of each of said portions of said first axial length.

12. The sealing device of claim 1, wherein said collar is secured to said supporting element by said clamping device.

13. The sealing device of claim 1, wherein a portion of said collar is secured to said sealing element by spot welding.

14. The sealing device of claim 1, wherein said supporting element further defines a second surface located opposite said supporting surface, wherein an edge of said collar is secured to said second surface by spot welding.

* * * * *